US012670699B2

(12) United States Patent
Li et al.

(10) Patent No.: US 12,670,699 B2
(45) Date of Patent: Jun. 30, 2026

(54) SYSTEMS AND METHODS FOR PATCHSWAP—A REGULARIZATION TECHNIQUE FOR VISION TRANSFORMERS

(71) Applicants: Baoxin Li, Chandler, AZ (US); Sachin Chhabra, Tempe, AZ (US)

(72) Inventors: Baoxin Li, Chandler, AZ (US); Sachin Chhabra, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 241 days.

(21) Appl. No.: 18/739,056

(22) Filed: Jun. 10, 2024

(65) Prior Publication Data

US 2024/0412489 A1      Dec. 12, 2024

Related U.S. Application Data

(60) Provisional application No. 63/507,350, filed on Jun. 9, 2023.

(51) Int. Cl.
*G06T 5/50* (2006.01)
*G06V 10/774* (2022.01)

(52) U.S. Cl.
CPC .............. *G06V 10/774* (2022.01); *G06T 5/50* (2013.01); *G06T 2207/20221* (2013.01)

(58) Field of Classification Search
CPC .................... G06V 10/774; G06T 5/50; G06T 2207/20221; G06T 2207/20081; G06T 5/60

USPC .......................................................... 382/156
See application file for complete search history.

(56) References Cited

U.S. PATENT DOCUMENTS

2020/0090316 A1*   3/2020   Man ..................... G06V 10/454

OTHER PUBLICATIONS

Arnab, A et al., "Vivit: A Video Vision Transformer," In Proceedings of the IEEE/CVF International Conference on Computer Vision, Oct. 10-17, 2021, pp. 6836-6846.
Berthelot, D. et al., "Mixmatch: A Holistic Approach to Semi-Supervised Learning," Proceedings of the 33rd International Conference on Neural Information Processing Systems, Dec. 8, 2019, pp. 5049-5059.
Chhabra, S. et al., "Glocal Alignment for Unsupervised Domain Adaptation," In Multimedia Understanding with Less Labeling on Multimedia Understanding with Less Labeling, Oct. 24, 2021, pp. 45-51.
Chhabra, S. et al., "Iterative Image Translation for Unsupervised Domain Adaptation," In 1st Workshop on Multimedia Understanding with Less Labeling, MULL 2021, co-located with ACM MM 2021, Association for Computing Machinery, Inc, Oct. 24, 2021,pp. 37-44.

(Continued)

*Primary Examiner* — Stephen P Coleman
(74) *Attorney, Agent, or Firm* — Polsinelli PC

(57) ABSTRACT

Examples of a computer-implemented regularization technique are described and tailor-made for Vision Transformers. Examples can combine two or more input images and swap patches between them to produce a PatchSwap image. The PatchSwap image is then used to train a Vision Transformer to predict the mixing ratio as well as the categories of the original images.

3 Claims, 7 Drawing Sheets
(5 of 7 Drawing Sheet(s) Filed in Color)

(56)            References Cited

OTHER PUBLICATIONS

Cubuk, E. D. et al., "Randaument: automated data augmentation with a reduced search space," In Proceedings of the IEEE/CVF Conference on Computer Vision and Pattern Recognition Workshops, Jun. 14-19, 2020, pp. 702-703.

Cubuk, E. D. et al., "Autoaugment: Learning Augmentation Policies from Data," 2019 IEEE/CVF Conference on Computer Vision and Pattern Recognition (CVPR), Jun. 15-20, 2019, 14 pages.

Devlin, J. et al., "BERT: Pre-training of Deep Bidirectional Transformers for Language Understanding," In Jill Burstein, Christy Doran, and Thamar Solorio, editors, Proceedings of the 2019 Conference of the North American Chapter of the Association for Computational Linguistics: Hu•man Language Technologies, NAACL-HLT 2019, Minneapolis, MN, USA, Association for Computational Linguistics, 2019, doi: 10,18653/v1/n19-1423, URL https://doi.org/10.18653/v1/n19-1423, Jun. 2-7, 2019, vol. 1 (Long and Short Papers), pp. 4171-4186.

Devries, T. et al., "Improved Regularization of Convolutional Neural Networks with Cutout," Aug. 2017, 8 pages.

Dosovitskiy, A. et al., "An Image is Worth 16×16 Words: Transformers for Image Recognition at Scale," In International Conference on Learning Representations, Oct. 22, 2020, 22 pages.

Hanson, S. J. et al., "Comparing Biases For Minimal Network Construction With Back-Propagation," Advances in Neural Information Processing Systems, 1, Jan. 1, 1988, 9 pages.

Hassani A. et al., "Escaping the Big Data Paradigm with Compact Transformers," Jun. 7, 2022, pp. 1-18.

He, K. et al., "Deep Residual Learning for Image Recognition," In Proceedings of the IEEE Conference on Computer Vision and Pattern recognition, Jun. 27-30, 2016, pp. 770-778.

He, K. et al., "Masked Autoencoders Are Scalable Vision Learners," In Proceedings of the IEEE/CVF Conference on Computer Vision and Pattern Recognition, Jun. 18-24, 2022, pp. 16000-16009.

Heo, B. et al., "Rethinking Spatial Dimensions of Vision Transformers," In Proceedings of the IEEE/CVF International Conference on Computer Vision, Oct. 10-17, 2021, pp. 11936-11945.

Ioffe S. et al. "Batch Normalization: Accelerating deep network training by Reducing Internal Covariate Shift," In International Conference on Machine Learning, Jul. 6, 2015, pp. 448-456.

Jaegle, A. et al., "Perceiver: General Perception with Iterative Attention," In International Conference on Machine Learning, Mar. 4, 2021, pp. 4651-4664.

Krizhevsky, A. et al., "Imagenet Classification with Deep Convolutional Neural Networks," Communications of the ACM, vol. 6, Issue 6, May 24, 2017, pp. 84-90.

Laine, S. et al., "Temporal Ensembling for Semi-Supervised Learning," In 5th International Conference on Learning Representations, ICLR 2017, Conference Track Proceedings, Apr. 24-26, 2017, 13 pages.

Lee, D-H. et al., "Pseudo-Label: The Simple and Efficient Semi-Supervised learning Method for Deep Neural Networks," In Workshop on Challenges in Representation Learning, ICML, vol. 3, Jul. 2013, 6 pages.

Liu, Z. et al., "Swin Transformer: Hierarchical Vision Transformer Using Shifted Windows," In Proceedings of the IEEE/CVF International Conference on Computer Vision, Oct. 10-17, 2021, pp. 10012-10022.

Netzer, Y. et al., "Reading Digits in Natural images with Unsupervised Feature Learning," In NeurIPS Workshop on Deep Learning and Unsupervised Feature Learning, Jan. 2011, 9 pages.

Redmon, J. et al., "You only look once: Unified, Real-Time Object Detection," In Proceedings of the IEEE Conference on Computer Vision and Pattern Recognition, Jun. 27-30, 2016, pp. 779-788.

Srivastava, N. et al., "Dropout: A Simple Way to Prevent Neural Networks from Overfitting," The Journal of Machine Learning Research, vol. 15, Issue 1, Jan. 1, 2014, pp. 1929-1958.

Szegedy, C. et al., "Going Deeper with Convolutions," In Proceedings of the IEEE Conference on Computer Vision and Pattern Recognition, Jun. 2015, pp. 1-9.

Tan, M. et al., "EfficientNet: Rethinking Model Scaling for Convolutional Neural Networks," In International Conference on Machine Learning, May 24, 2019, pp. 6105-6114.

Tarvainen, A. et al., "Mean teachers are better role models: Weight-averaged consistency targets improve semi-supervised deep learning results," NIPS'17: Proceedings of the 31st International Conference on Neural Information Processing Systems, Dec. 4, 2017, pp. 1195-1204.

Touvron, H. et al., "Training data-efficient image transformers & distillation through attention," In International Conference on Machine Learning, Jul. 1, 2021, pp. 1034-10357.

Vaswani, A. et al., "Attention Is All You Need," Advances in Neural Information Processing Systems, Dec. 4, 2017, pp. 6000-6010.

Xiao, H. et al., "Fashion-MNIST: a Novel Image Dataset for Benchmarking Machine Learning Algorithms," Aug. 25, 2017, 6 pages.

Xie, Q. et al., "Unsupervised Data Augmentation for Consistency Training," Advances in Neural Information Processing Systems, Nov. 5, 2020, pp. 6256-6268.

Yun, S. et al., "CutMix: Regularization strategy to Train Strong Classifiers with Localizable Features," In Proceedings of the IEEE/CVF international conference on Computer Vision, Oct. 27, 2019, pp. 6023-6032.

Zhang, H. et al., "mixup: Beyond Empirical Risk Minimization," In International Conference on Learning Representations, Apr. 27, 2018, pp. 1-13.

* cited by examiner

SYSTEMS AND METHODS FOR PATCHSWAP—A REGULARIZATION TECHNIQUE FOR VISION TRANSFORMERS

CROSS REFERENCE TO RELATED APPLICATIONS

This is a non-provisional application that claims benefit to U.S. Provisional Application Ser. No. 63/507,350 filed on Jun. 9, 2023, which is herein incorporated by reference in its entirety.

GOVERNMENT SUPPORT

This invention was made with government support under Grant No. N00014-19-1-2119 awarded by the Office of Naval Research. The Government has certain rights in the invention.

FIELD

The present disclosure generally relates to machine learning and training technologies; and more particularly to technique for regularizing vision transformers by swapping image patches between two images to create a regularized input for training.

BACKGROUND

Transformers were originally designed for natural language processing but their application to other domains is rapidly gaining traction. Images have a continuous grid-like structure while the transformers require sequential series data as input, making them incompatible initially. In computer vision, Convolution neural networks (ConvNets) have been the traditional choice of deep learning framework for image recognition task for almost a whole decade. However, in 2020, Vision Transformers (ViT) fixed past issues and created a new benchmark by outperforming ConvNets on the ImageNet dataset. Vision Transformers split images into 16×16 square patches and flatten them into a vector to form series-like input data. Vision Transformers process each patch using a fully connected layer to learn its embedding. A learnable or a fixed (sinusoidal) positional embedding is added to this feature embedding at the input level to provide spatial information. Transformers project the embeddings into queries, keys, and values and compute self-attention between the patches. Each layer of the transformer consists of a self-attention block, fully-connected layers followed by a normalization layer. The overall architecture of the Vision Transformer is similar to a BERT encoder. Vision Transformers also use a learnable classification token which is concatenated to input patches. This token is considered to represent the content of the entire image while the patches contain the local spatial information. At the output layer, a classification token is used to classify the input.

Nevertheless, performance is only optimal when there is abundant training data available. In addition, major challenges when dealing with small datasets is that a Vision Transformer often overfits and results in poor generalization. Multiple attempts have been made to adapt a Vision Transformer to small datasets by modifying the transformer architecture, distillation, etc., however technical problems persist.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

The present disclosure relates to examples of a system and associated methods for regularization techniques for Vision Transformers using image patch swapping ("PatchSwap"). Vision Transformers have recently gained popularity due to their superior performance on visual computing tasks. However, this performance is based on training with huge datasets, and maintaining the performance on small datasets remains a challenge. Regularization helps to alleviate the overfitting issue that is common when dealing with small datasets. Most existing regularization techniques are designed keeping ConvNets in mind. As Vision Transformers process images differently, there is a need for new regularization techniques crafted for them. The inventive concept herein proposes a regularization called PatchSwap, which interchanges the patches between two images, resulting in a new input for regularizing the transformer. Extensive experiments showcase that PatchSwap yields superior performance than existing state-of-the-art methods. Further, the simplicity of PatchSwap makes a straightforward extension to a semi-supervised setting with minimal effort.

Introduction

The major challenge when dealing with small datasets is that a Vision Transformer often overfits and results in poor generalization. To combat overfitting, commonly used regularization solutions are dropout, weight decay, label smoothing, batch normalization, data augmentations. Other advanced augmentation techniques like Mixup, Cutmix create intermediate images by combining multiple images. All of these have become a staple part of training ConvNets as well as Vision Transformers. Although Mixup and Cutmix work well for both these network types, they were originally designed for ConvNets, which raises the question—can we design data augmentation specialized for Vision Transformers to boost their performance? Both the network types take image input and predict its label but differ in the way they process the images. ConvNets process an image spatially like a grid and uses kernels to extract features whereas Vision Transformer divides the image into fixed size patches and uses self-attention mechanism. ConvNets have constraints of spatial equivariance inbuilt into them which is essential for modeling vision data. On the other hand, Vision Transformers do not have such constraints and must learn to model spatial equivariance from large amounts of data.

Figure 1:
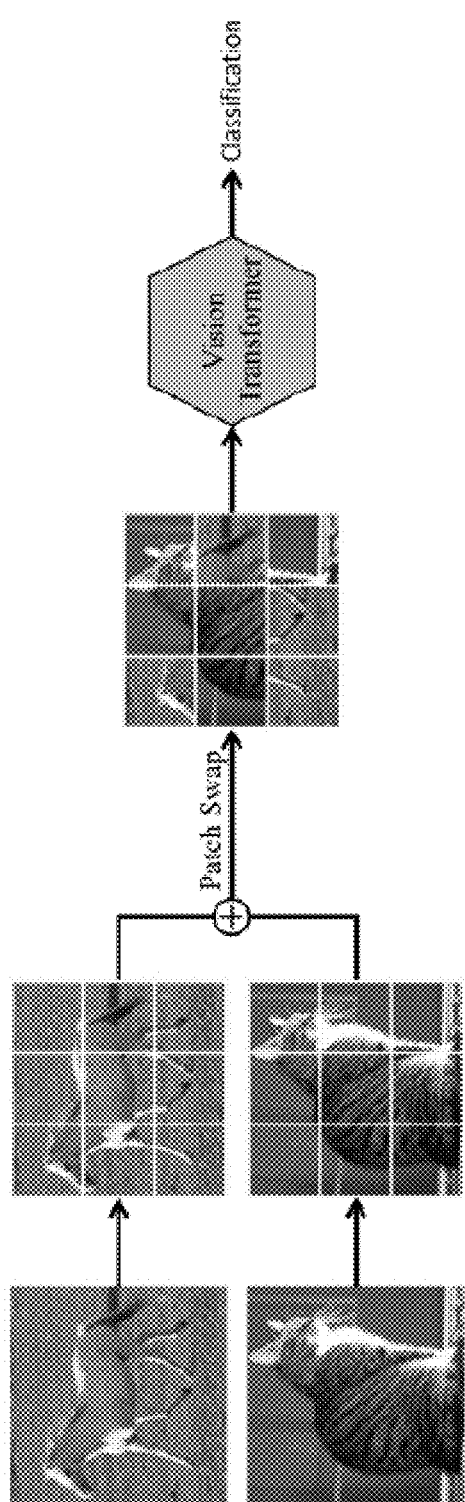
FIG. 1 is an illustration of an overview of the PatchSwap technique. Images are divided into patches and the patches between two images are swapped (without changing their relative positions) to create a PatchSwap image.

Keeping Vision Transformers in mind, we propose PatchSwap, a simple yet novel data augmentation technique that interchanges the patches of images to increase the amount of training data and thereby regularizes the performance. PatchSwap shares multiple similarities with Mixup and Cutmix, including (i) preventing overfitting by regularizing the network by mixing images and labels; (ii) linearly interpolating the image consistently within the label space. However, Mixup and Cutmix do not fully utilize the global receptive field of Vision Transformers. ConvNets grow their receptive field with depth whereas a Vision Transformer can learn to interact between any pair of pixels from the beginning at the input layer encoders. Hence, the related patches can be anywhere in the image and Vision Transformer extract relevant information from them. Based on this understanding, our approach divides two images into patches and then randomly swaps patches between them to create a PatchSwap image (FIG. 1). Similar to Cutmix, PatchSwap images contain regions from both classes, but the objects are scattered throughout the PatchSwap image, and the Vision Transformer is trained to predict the objects with their mixing ratios.

In this paper, we showcase PatchSwap as an effective regularization technique for Vision Transformers. It outperforms state-of-the-art methods for datasets like CIFAR-10 and CIFAR-100. We also show that PatchSwap not only regularizes effectively but can also be utilized with unlabeled data (extending to a semi-supervised learning setting). Most of the existing semi-supervised techniques are based on consistency regularization, where a network is trained to produce the same output for two versions of an input image. Unsupervised PatchSwap works on the same principle. Since the PatchSwap images contain a mix of objects from different images, the consistency regularization between the original and the PatchSwap image cannot be implemented. However, if we create two different PatchSwap images of two inputs and ensure that their mixing coefficients are the same, we can train the Vision Transformer to produce consistent outputs for these PatchSwap images. In essence, unsupervised PatchSwap applies the consistency regularization between two PatchSwap images.

Vision Transformer

Images have a continuous grid-like structure while the transformers require sequential series data as input, making them incompatible initially. However, Vision Transformers were introduced to the world in 2020. They split images into 16×16 square patches and flatten them into a vector to form series-like input data. Vision Transformers processes each patch using a fully connected layer to learn its embedding. A learnable or a fixed (sinusoidal) positional embedding is added to this feature embedding at the input level to provide spatial information. Transformers project the embeddings into queries, keys, and values and compute self-attention between the patches. Each layer of the transformer consists of a self-attention block, fully-connected layers followed by a normalization layer. The overall architecture of the Vision Transformer is similar to a BERT encoder. Vision Transformer also uses a learnable classification token which is concatenated to input patches. This token is considered to represent the content of the entire image while the patches contain the local spatial information. At the output layer, a classification token is used to classify the input.

Regularization

When the size of training data is not large enough for a network, it tends to overfit and generalize poorly on unseen data. Several regularization techniques like dropout, label smoothing, and various data augmentations have been proposed in the past to alleviate this problem. Most of these techniques prevent high confidence predictions on samples. Label smoothing divides a pre-defined probability evenly among all the classes to form a smooth probability vector instead of a one-hot vector for training the network. Cutout is another regularization technique inspired by dropout. It randomly removes a portion of the image and makes the network focus on other parts of the image. This ensures that the overall image is considered while making a prediction instead of just a small portion of it.

Some data augmentation techniques combine multiple inputs to create a new input for training. Mixup is a technique that combines two random samples using $x_{mixup} = \lambda x_a + (1-\lambda)x_b$ where $x_a$ and $x_b$ are two input images and $\lambda \in [0, 1]$ is their mixing ratio. The network is trained to linearly interpolate the predictions according to the input. Similarly, Cutmix uses a binary mask M on an image to stitch portions of two images together using $x_{cutmix} = M \cdot x_a + (1-M) \cdot x_b$. This results in aesthetically better images and higher performance as well.

Semi-Supervised Learning

Semi-supervised learning techniques aim to utilize unlabeled data along with the labeled data for better generalization. A popular semi-supervised learning technique, Pseudo-label, utilizes the network prediction as the ground truth if the confidence is above a certain threshold. Other techniques use a constraint on unlabeled data during training in such a way that it does not require its labels. Π-model proposed that a network should produce consistent outputs despite small changes in the network or the input. This was achieved by reducing the mean-squared error between the outputs obtained by passing either an input twice through a network with stochasticity like dropout or by augmenting an image to create its different versions. MeanTeacher showcased that a teacher network trained with exponential moving weights average provides better targets for unlabeled data. Mixup along with consistency regularization was used in MixMatch. Consistency regularization between a weak and a strong augmentation was also proposed.

Proposed Approach (Technical Solution): PatchSwap

PatchSwap is a simple regularization technique tailor-made for Vision Transformers. It combines two input images and swaps patches between them to produce a PatchSwap image. The PatchSwap image is then used to train a Vision Transformer to predict the mixing ratio as well as the categories of the original images.

Let $x_a$, $x_b \in [0, 1]^{C \times H \times W}$ be two input images, where C, H, W are the number of channels, the height and the width of the images, respectively. Let $y_a$ and $y_b$ be their respective labels. Given a patch size P, we divide the images into patches of equal size $I_a$ and $I_b$, where $$I_a = \left[x_a^1, x_a^2, \ldots, x_a^N\right], I_b = \left[x_b^1, x_b^2, \ldots, x_b^N\right], \text{ and } x^i \in [0, 1]^{C \times P \times P}$$

is the i-th patch of image x. The number of patches $$N = \frac{H}{P} \times \frac{W}{P},$$

where P is a factor of H and W to ensure that N is an integer.

PatchSwap generates a new image $x_{ps}$ using the patches $I_a$ and $I_b$ and a mixing ratio $\lambda$. We sample the mixing ratio $\lambda$, from a Beta distribution $\lambda \sim \text{Beta}(\alpha, \alpha)$, where $\alpha$ is a constant that defines the Beta distribution. $\lambda$ is converted to a discrete value $\lambda' \in \{0, 1, \ldots, N\}$, where $\lambda' = \text{round}(\lambda \cdot N)$ to estimate the number of patches to be mixed. We generate a random binary mask $M = [M^1, M^2, \ldots, M^N] \in \{0, 1\}^N$ where $M^i = 0$ indicates the i-th patch is not selected and $M^i = 1$ indicates the patch is selected in the mix and $\lambda' = \text{sum}(M)$. We mix the patches from the two images to generate a PatchSwap image $x_{ps}$, $$x_{ps}(x_a; x_b; \lambda) = I_a \cdot M + I_b \cdot (1 - M), \quad (1)$$

where '·' denotes the element-wise multiplication between a patch $x^i$ and the corresponding mask element $M^i$. The '+' is overridden to denote a mixing operation combining the two images. FIG. 1 displays a PatchSwap between two images with a mixing ratio $\lambda = 0.4$ and N=9.

The PatchSwap image $x_{ps}$ has image components from $x_a$ and $x_b$. We use a cross-entropy loss to train a Vision Transformer to predict both the labels $y_a$ and $y_b$. The loss term is given as, $$\mathcal{L}_{ps}(x_a; y_a; x_b; y_b; \lambda) = \lambda \mathcal{L}_{ce}(f(x_{ps}; \theta_t), y_a) + (1 - \lambda)\mathcal{L}_{ce}(f(x_{ps}; \theta_t), y_b), \quad (2)$$

where $\mathcal{L}_{ce}$ represents the standard cross-entropy loss, f(x; $\theta_t$) is the output prediction for image x for the Vision Transformer with parameters $\theta_t$.

Unsupervised PatchSwap Applied to Semi-Supervised Learning

PatchSwap is a simple regularization technique for labeled data. However, it can also be used for unlabeled data, extending it to semi-supervised learning applications. Popular semi-supervised learning methods are based on consistency regularization. Consistency regularization states that two distinct versions of the same input should give consistent results. Two distinct versions can be generated by either variations in the network, like Dropout or by modifying the input in two different ways. The network is trained to output the same predictions for the two distinct inputs. Standard loss functions like mean-squared error, Kullback-Leibler-divergence, etc., are used to guide the training.

Figure 2:
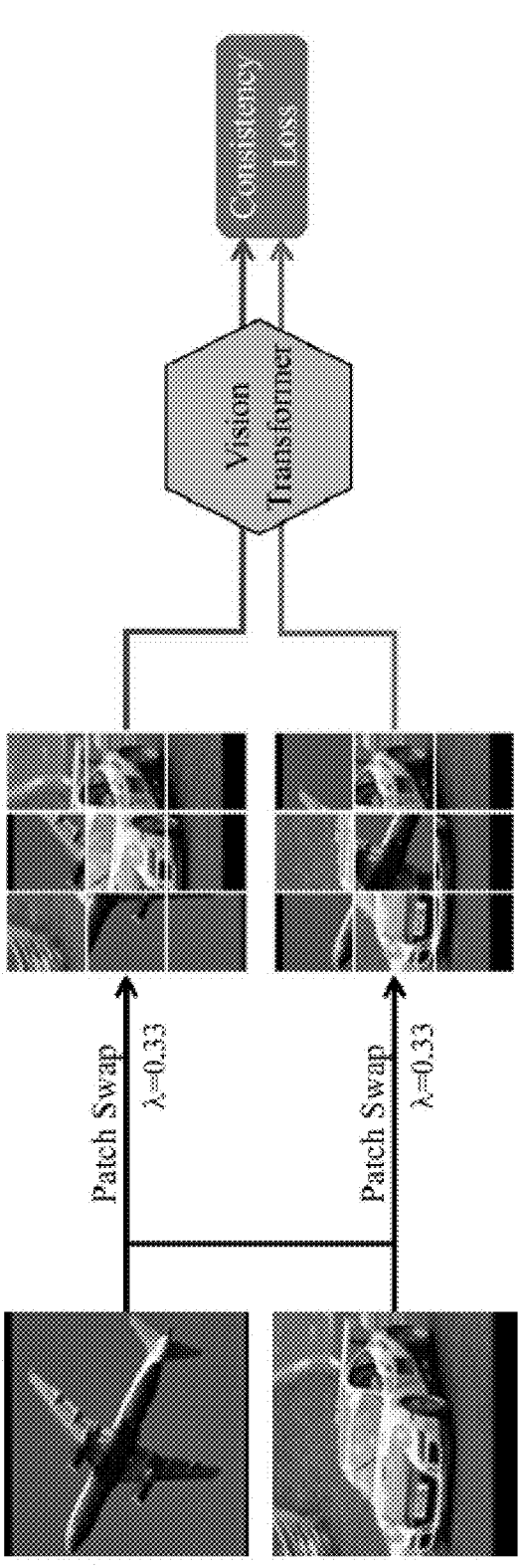
FIG. 2 is an overview of the Unsupervised PatchSwap regularization for semi-supervised learning. Two images are combined to create two distinct versions of PatchSwap images with same mixing coefficients. Vision Transformer is trained to produce consistent output for both the inputs.

Unsupervised PatchSwap is inspired by the above principle. Given two unlabeled images $x_1$ and $x_2$, we generate two patch swap masks $M_1$ and $M_2$ using the same mixing ratio $\lambda \sim \text{Beta}(\alpha, \alpha)$. We ensure $M_1 \neq M_2$. Using $x_1$, $x_2$ and $M_1$, we generate the PatchSwap image $x_{ps_1}$. Similarly, with $x_1$, $x_2$ and $M_2$, we generate the 2nd PatchSwap image $x_{ps_2}$. Since $M_1$ and $M_2$ are generated using the same mixing ratio $\lambda$, the ratio of the number of patches from $x_1$ and $x_2$ is identical in $x_{ps_1}$ and $x_{ps_2}$, even though the same patches are not swapped since $M_1 \neq M_2$. This ensures $x_{ps_1}$ and $x_{ps_2}$ are different. This is illustrated in FIG. 2 where two different images are generated with a mixing ratio $\lambda = 0.33$. We want to train a Vision Transformer f(•; $\theta_t$) that generates the same output for $x_{ps_1}$ and $x_{ps_2}$ given that their swapping ratios are identical. We define an unsupervised loss to enforce this consistency regularization using, $$\mathcal{L}_{cr}(x_1; x_2; \lambda) = \left\| f\left(x_{ps_1}; \theta_t\right) - f\left(x_{ps_2}; \theta_t\right) \right\|^2. \quad (3)$$

In the semi-supervised context, we have a labeled pool of data $D_l$ and an unlabeled pool of data $D_u$. We apply PatchSwap regularization loss on the labeled data $D_l$ and unsupervised PatchSwap on the unlabeled data $D_u$. The final equation for the semi-supervised training loss is, $$\mathop{\mathbb{E}}_{(x_a, y_a),(x_b, y_b) \sim D_l} \mathcal{L}_{ps}(x_a; y_a; x_b; y_b; \lambda) + \gamma \mathop{\mathbb{E}}_{x_1, x_2 \sim D_u} \mathcal{L}_{cr}(x_1; x_2; \lambda) \quad (4)$$

where $\gamma$ is a hyper-parameter that balances the two loss components.

TABLE 1

Comparison of Top-1 classification accuracies on CIFAR-10, FashionMNIST and SVHN datasets using different patch sizes.

| | Dataset | | | | | | | | |
| | CIFAR-10 | | | FashionMNIST | | | SVHN | | |
| Patch Size | 4 | 8 | 16 | 4 | 8 | 16 | 4 | 8 | 16 |
|---|---|---|---|---|---|---|---|---|---|
| Cross Entropy | 83.3 | 78.3 | 69.8 | 92.1 | 92.8 | 91.2 | 96.4 | 94.7 | 92.7 |
| Label smoothing | 83.0 | 79.0 | 69.6 | 92.0 | 92.9 | 91.5 | 96.5 | 94.8 | 92.8 |
| Cutout | 84.0 | 79.2 | 70.1 | 94.2 | 93.5 | 91.4 | 96.8 | 96.2 | 94.5 |
| Mixup | 87.4 | 82.3 | 74.3 | 93.0 | 93.4 | 92.2 | 97.0 | 95.7 | 94.2 |
| Cutmix | 88.0 | 82.7 | 73.8 | 94.0 | 93.8 | 92.5 | 96.9 | 96.2 | 94.8 |
| PatchSwap | 88.3 | 84.7 | 74.9 | 94.4 | 93.9 | 92.6 | 97.2 | 96.8 | 94.8 |

Bold numbers represent the highest accuracy.

Experiments

To assess the performance of PatchSwap, we tested it on various datasets: CIFAR-10, CIFAR-100, SVHN, Fashion-MNIST and Tiny-ImageNet as these datasets represent different types of images. Training Vision Transformers requires a huge amount of data and robust regularization. However, the chosen datasets are tiny and we apply standard augmentation techniques during training. For CIFAR-10 and CIFAR-100, we use a random-crop with zero padding of 4 and a horizontal flip with a probability of 0.5. Tiny-ImageNet is a subset of Imagenet with 200 classes and image size of 64×64 pixels. We use the same augmentations as that of CIFAR datasets for it. We also test Tiny-Imagenet images with RandAugment augmentation (strong augmentation). FashionMNIST consists of grayscale images which we resize to 32×32 pixels. We use a random-crop with zero padding of 2 and a random horizontal flip as the augmentations. For SVHN, we resize the images to 32×32 pixels and use a random-crop with zero padding of 2. We also evaluate the proposed method under different augmentations and present those results in the supplementary material.

Training Details

For our experiments, we use ViT-Lite which is a scaled-down version of the original Vision Transformer. Specifically, we use 6 encoder blocks with 256 hidden dimension size and 0.1 dropout. The forward expansion layer is set to 512 and the number of attention heads is reduced to 4. This results in about 3.7 million parameters as compared to 86 million in the original Vision Transformer. We train the Vision Transformer from scratch. Due to the absence of results for baseline approaches, we use the official code from their respective repositories to report the results. We use 8×8 cutout size for CIFAR-100, 16×16 for CIFAR-10 and FashionMNIST, 20×20 for SVHN and 32×32 for TinyImagenet. Cutmix is applied with 0.5 probability. For label smoothing, $\varepsilon$ is always set to 0.1 unless specified. We set $\alpha=1.0$ for all the experiments.

TABLE 2

Comparison of Top-1 and Top-5 classification accuracies on CIFAR-100 dataset using different patch sizes for a Vision Transformer.

| Method | Patch Size | | | | | |
|---|---|---|---|---|---|---|
| | 4 | | 8 | | 16 | |
| | Top-1 | Top-5 | Top-1 | Top-5 | Top-1 | Top-5 |
| Cross Entropy | 57.9 | 81.5 | 50.6 | 76.2 | 39.3 | 65.0 |
| Label smoothing | 58.3 | 77.0 | 51.5 | 71.7 | 39.8 | 62.3 |
| Cutout | 57.0 | 81.1 | 50.2 | 76.1 | 39.1 | 64.7 |
| Mixup | 63.5 | 85.0 | 56.8 | 80.0 | 45.3 | 70.6 |
| Cutmix | 63.7 | 85.2 | 57.0 | 80.4 | 44.2 | 69.5 |
| PatchSwap | 64.9 | 86.4 | 58.5 | 82.5 | 45.7 | 71.6 |

Bold numbers represent the highest accuracy.

TABLE 3

Comparison of Top-1 and Top-5 classification accuracies on TinyImagenet dataset with standard (Random crop with padding and Random horizontal flip) and RandAugment augmentations using different patch sizes for a Vision Transformer.

| | Augmentation | | | | | | | |
|---|---|---|---|---|---|---|---|---|
| | Standard | | | | RandAugment | | | |
| | Patch Size | | | | | | | |
| | 8 | | 16 | | 8 | | 116 | |
| Method | Top1 | Top5 | Top1 | Top5 | Top1 | Top5 | Top1 | Top5 |
| Cross Entropy | 41.9 | 65.2 | 34.4 | 57.7 | 46.2 | 70.4 | 39.1 | 63.4 |
| Label smoothing | 42.8 | 63.0 | 34.6 | 56.5 | 47.0 | 69.7 | 39.3 | 62.7 |
| Cutout | 42.8 | 66.6 | 33.8 | 58.1 | 47.5 | 71.5 | 40.2 | 65.1 |
| Mixup | 46.6 | 69.0 | 38.5 | 62.4 | 49.9 | 73.5 | 43.2 | 67.5 |
| Cutmix | 48.4 | 71.6 | 39.5 | 63.5 | 48.4 | 74.9 | 44.0 | 68.0 |
| PatchSwap | 49.9 | 73.4 | 41.8 | 66.3 | 52.8 | 77.0 | 45.6 | 70.8 |

Bold numbers represent the highest accuracy.

ViT-Lite uses a smaller patch size than the original Vision Transformer. We performed our experiments with 4, 8, and 16 patch sizes, and the best performance was observed with a patch size of 4. We report the results for 4, 8, and 16 patch sizes, except for Tiny-Imagenet where we use only 8 and 16 due to computation overhead. A smaller patch size increases the number of patches and in turn, increases the data available to the network for training but it also increases the computation quadratically. All experiments including the baselines follow the same training procedure. We train the network for 300 epochs with a batch size of 128 and 0.03 weight decay. We use a learning rate of $5\times10^{-4}$ which is warmed up for the first 10 epochs and then decayed per epoch using a cosine schedule.

Results

We compare our approach with state-of-the-art regularization techniques—label smoothing, Cutout, Mixup, and Cutmix. The results for CIFAR-10, SVHN and FashionM-NIST are in Table 1, for CIFAR-100 in Table 2, and for Tiny-Imagenet in Table 3. Our approach outperforms all the baselines for all patch sizes. PatchSwap gains approximately 1.5% and 2.5% over Cutmix and Mixup respectively, and about 9% over the standard cross-entropy loss. In addition, PatchSwap outperforms RandAugment augmentation for Tiny-Imagenet. Combining RandAugment with PatchSwap further boosts its performance over the baseline approaches.

TABLE 4

Classification accuracies on CIFAR-10 and SVHN datasets in a semi-supervised setting.

| | Dataset | | | | | |
|---|---|---|---|---|---|---|
| | CIFAR-10 | | | SVHN | | |
| Patch Size | 4 | 8 | 16 | 4 | 8 | 16 |
| Cross Entropy | 56.0 | 53.5 | 45.4 | 87.9 | 86.7 | 76.0 |
| Pseudo Label | 58.1 | 54.0 | 46.3 | 91.2 | 88.9 | 78.0 |
| Mean Teacher | 62.6 | 56.5 | 48.2 | 96.2 | 95.1 | 90.1 |
| PatchSwap (Labeled only) | 63.2 | 60.6 | 51.3 | 89.7 | 87.2 | 81.0 |
| PatchSwap (Full) | 67.6 | 62.9 | 54.2 | 96.4 | 96.7 | 90.9 |

Bold numbers represent the highest accuracy.

Semi-Supervised Learning (Experiments)

We perform semi-supervised learning experiments on CIFAR-10 and SVHN using 4000 labeled training samples and all the training samples in the unlabeled set. Pseudo-label training uses a threshold of 0.9 probability. MeanTeacher uses a teacher network with an exponential moving average of the student network to generate output targets for the unlabeled data. We used two augmented versions of the inputs—the first one is used for generating the output targets using the teacher network and the other one is used to train the student network.

Our approach also utilizes the exponential moving average. However, it does not require multiple augmented versions of an image. The consistency regularization is imposed on the two patch versions of the same image. The teacher network is used to generate targets from the first PatchSwap image and the student network is trained to match outputs using the second PatchSwap image. The $\gamma$ is set to 100 based for all the experiments. The unlabeled loss is linearly increased over the first 10 epochs. The rest of the setup for semi-supervised learning experiments is the same as regularization experiments.

The results for these experiments are shown in Table 4. We also showcase the results of training with just the labeled data—PatchSwap (Labeled only). PatchSwap (Full) combines PatchSwap and Unsupervised PatchSwap. Our approach outperforms the baselines methods. The PatchSwap with labeled loss outperforms MeanTeacher on CIFAR-10 only and unsupervised PatchSwap provides additional gain.

Analysis

Regularization Intensity

The hyperparameter, $\alpha$ controls the regularization intensity of PatchSwap. The mixing coefficient generated by the Beta distribution is rounded to the closest multiple of $$\frac{1}{N}$$

where N is the number or patches, as it can take discrete values only. A small value of $\alpha$ in Beta distribution generates values close to 0 or 1 and due to rounding, the mixing coefficient will end up being 0 or 1. This will result in PatchSwap reducing down to cross-entropy loss.

Similarly, a high value of a will result in mixing ratio of 0.5. Thus, a parameter handles the balance between cross-entropy and regularization in such a way.

Figure 3:
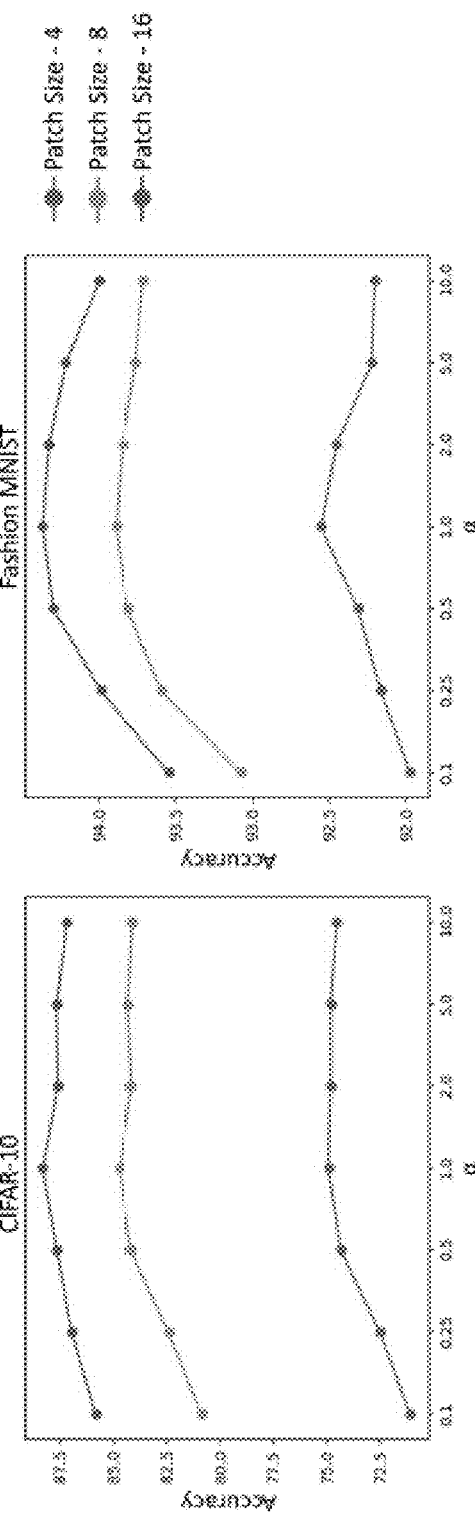
FIG. 3 illustrates a pair of graphs showing the impact of a on the CIFAR-10 (left) and FashionMNIST (right) datasets. Different patch sizes used for training the transformers are denoted by different colors.

We experiment with different values of $\alpha$ on CIFAR-10 and FashionMNIST datasets. The results are displayed in FIG. 3. As expected, a low value of a results in significantly poor performance (close to cross-entropy loss). Also, a high value of $\alpha$ leads to decrease in the performance. $\alpha=1$ (as used in all our experiments) results in a uniform distribution and functions as cross-entropy loss with $$\frac{1}{N}$$

probability.

Number of Samples

Figure 4:
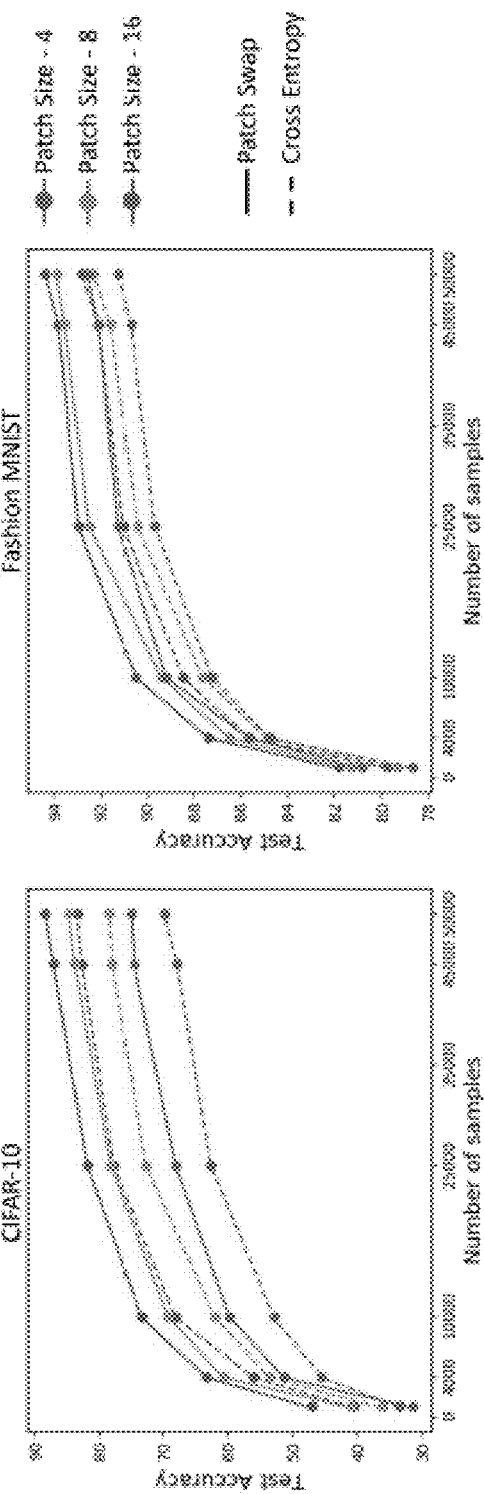
FIG. 4 illustrates a pair of graphs showing a comparison of Number of samples vs Test Accuracy for CIFAR-10 and Fashion-MNIST dataset. Different patch sizes used for training the Vision Transformers are denoted by different colors.

In this section, we reduce the available training data to assess the strength of our regularization. We perform these experiments with CIFAR-10 and FashionMNIST datasets and the results are shown in FIG. 4. We set the available number of training samples to 1000, 4000, 10000, 25000, 45000, full set, and report the test accuracy. We compare the results with the standard cross-entropy loss (shown using dashed lines) for various patch sizes. PatchSwap with only 10,000 CIFAR-10 labeled training samples achieves performance equivalent to supervised training with 25,000 samples. Similarly, for FashionMNIST, PatchSwap significantly reduces the amount of labeled data required for training.

Attention Maps

Figure 5:
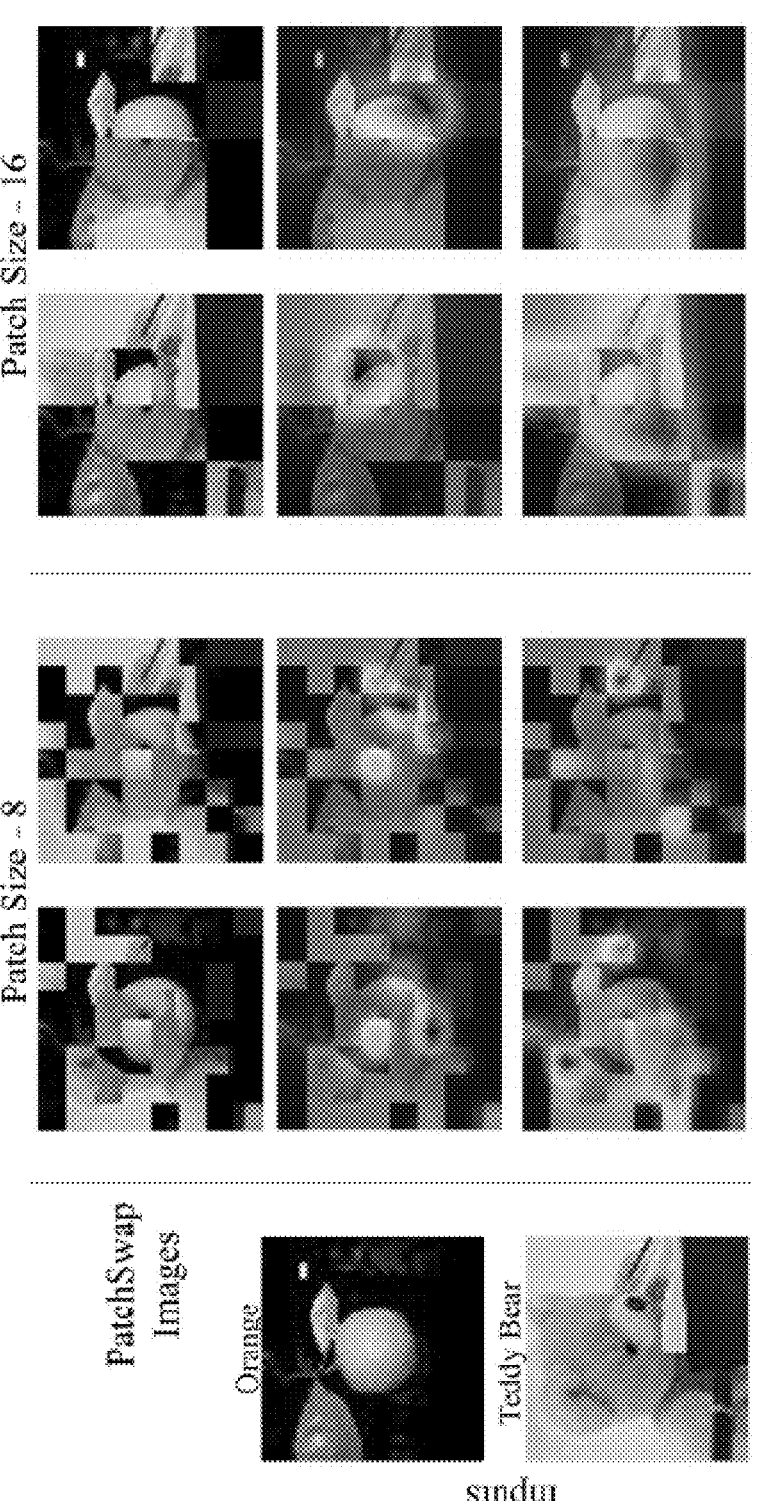
FIG. 5 illustrates class-specific Attention Maps for PatchSwap images. The first column shows the input images. We generate PatchSwap images for two different patch sizes—8 ($2^{nd}$ and $3^{rd}$ column) and 16 ($4^{th}$ and $5^{th}$ column). The $2^{nd}$ row displays the attention map for Orange and the last row shows for Teddy Bear.

We visualize class-specific attention maps for the PatchSwap images in FIG. 5. We can observe that the network has learned to focus on the correct patches for classification. For example, for the orange class, the network focuses on the patches in the middle ($2^{nd}$ row) where most of the orange is in the original and PatchSwap images. Similarly, the network focuses on the patches belonging to the Teddy Bear image while classifying it.

Summary

The PatchSwap technique is suitable for regularizing Vision Transformers. Our approach swaps image patches between two images to create a regularized input for training. Also, it can be further extended to Unsupervised PatchSwap for semi-supervised applications by applying consistency regularization on two PatchSwap images. Through extensive experiments, we showcase the strength of PatchSwap over existing state-of-the-art techniques on various datasets.

Figure 6:
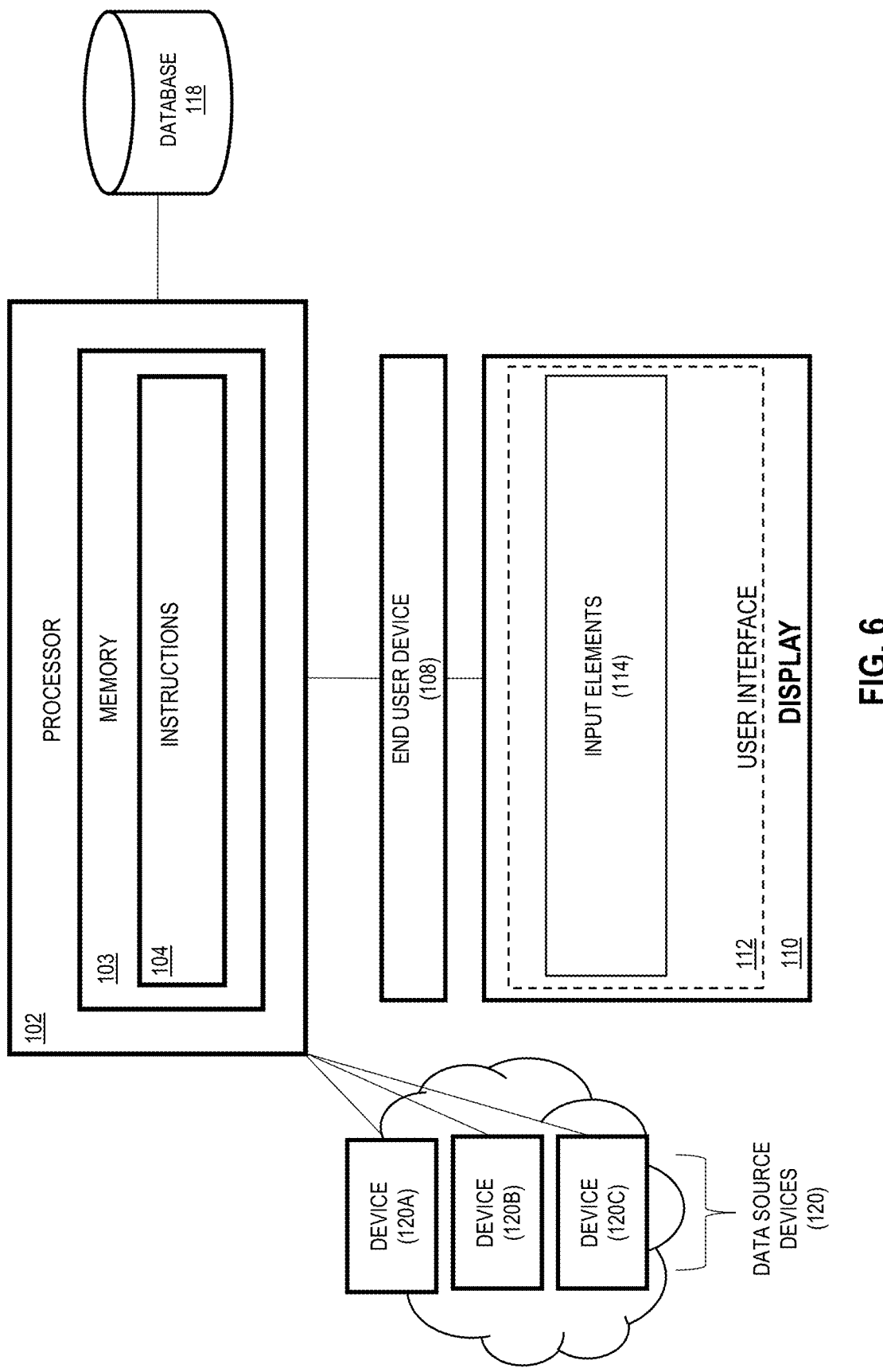
FIG. 6 is a simplified illustration of an example system/framework for implementing the inventive concepts described herein.

Referring to FIG. 6, embodiments of a system described herein may take the form of a computer-implemented system, designated system 100, configured for PatchSwap as described herein. In general, as indicated, the system 100 includes at least one processor 102 or processing element that is configured for executing functions/operations described herein; e.g., the processor 102 can execute instructions 104 stored in a memory 103 including any form of machine-readable medium. In general, the processor 102, via instructions, accesses input data and is configured to combine two (or more) input images and swaps patches between them to produce a PatchSwap image. The PatchSwap image is then used to train a Vision Transformer to predict the mixing ratio as well as the categories of the original images, among other functions described herein.

The instructions 104 may be implemented as code and/or machine-executable instructions executable by the processor 102 that may represent one or more of a procedure, a function, a subprogram, a program, a routine, a subroutine, a module, an object, a software package, a class, or any combination of instructions, data structures, or program statements, and the like. In other words, one or more of the features for processing described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium (e.g., the memory 103 and/or the memory of computing device 1200), and the processor 102 performs the tasks defined by the code. In some embodiments, the processor 102 is a processing element of a cloud such that the instructions 104 may be implemented via a cloud-based web application.

In some examples, the processor access input data from an end user device 108 in operable communication with a display 110. An end-user, via a user interface 112 rendered along the display 110, can provide input elements 114 to the processor 102 for executing functionality herein. In addition, examples of the system 100 include one or more data source devices 120 for accessing by the processor 102 datasets, images, and other input data as described herein.

Figure 7:
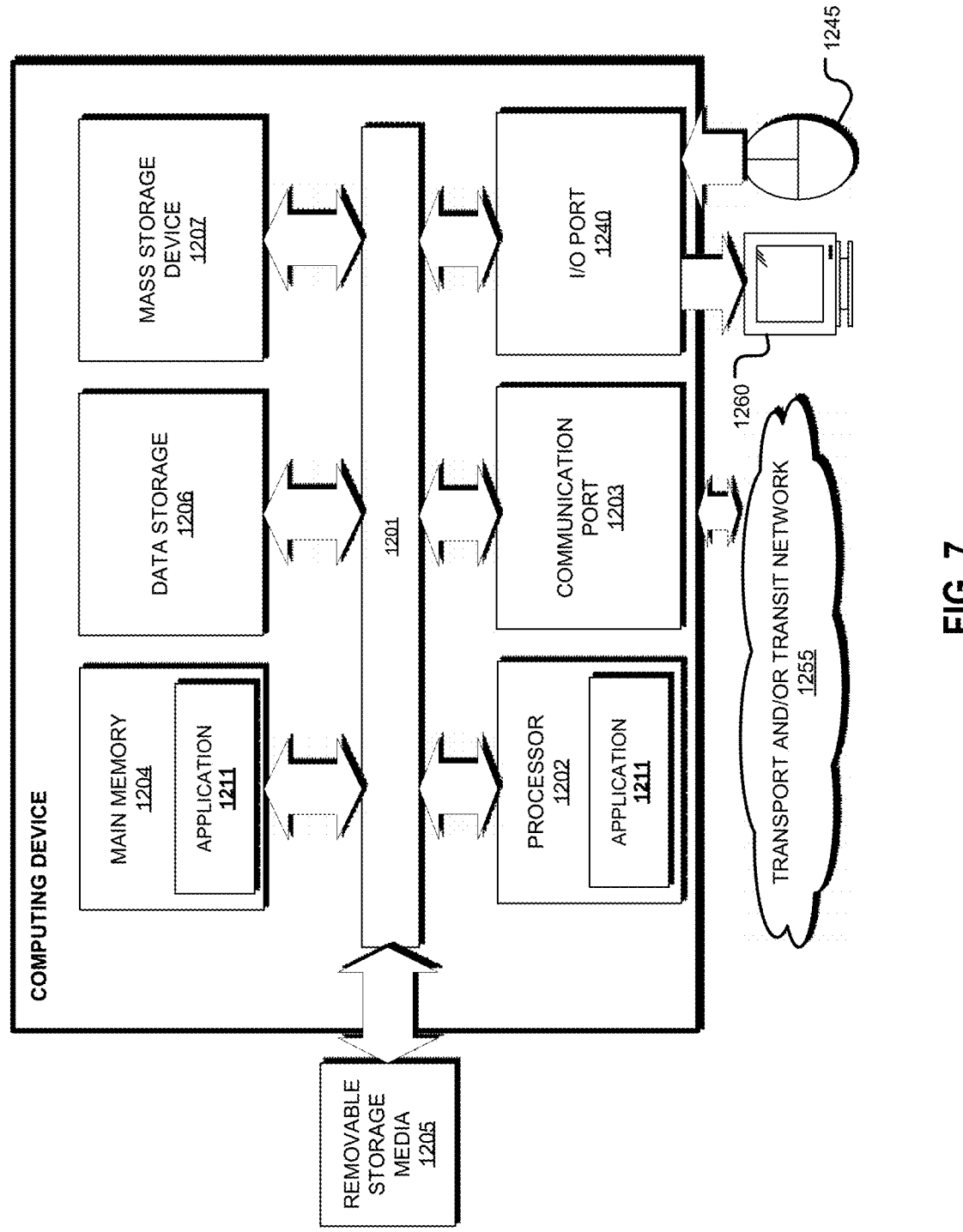
FIG. 7 is a simplified illustration of a computing device that may be implemented with or as part of example systems described herein.

Referring to FIG. 7, a computing device 1200 is illustrated which may be configured, via the instructions 104 and/or other computer-executable instructions, to execute functionality described herein. More particularly, in some embodiments, aspects of the system and/or methods described herein may be translated to software or machine-level code, which may be installed to and/or executed by the computing device 1200 such that the computing device 1200 is configured to functionality described herein. It is contemplated that the computing device 1200 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 1200 may include various hardware components, such as a processor 1202, a main memory 1204 (e.g., a system memory), and a system bus 1201 that couples various components of the computing device 1200 to the processor 1202. The system bus 1201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 1200 may further include a variety of memory devices and computer-readable media 1207 that includes removable/non-removable media and volatile/non-volatile media and/or tangible media, but excludes transitory propagated signals. Computer-readable media 1207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 1200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 1204 includes computer storage media in the form of volatile/nonvolatile memory such as read only memory (ROM) and random access memory (RAM). A basic input/output system (BIOS), containing the basic routines that help to transfer information between elements within the computing device 1200 (e.g., during start-up) is typically stored in ROM. RAM typically contains data and/or program modules that are immediately accessible to and/or presently being operated on by processor 1202. Further, data storage 1206 in the form of Read-Only Memory (ROM) or otherwise may store an operating system, application programs, and other program modules and program data.

The data storage 1206 may also include other removable/non-removable, volatile/nonvolatile computer storage media. For example, the data storage 1206 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 1200.

A user may enter commands and information through a user interface 1240 (displayed via a monitor 1260) by engaging input devices 1245 such as a tablet, electronic digitizer, a microphone, keyboard, and/or pointing device, commonly referred to as mouse, trackball or touch pad. Other input devices 1245 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 1245 are in operative connection to the processor 1202 and may be coupled to the system bus 1201, but may be connected by other interface and bus structures, such as a parallel port, game port or a universal serial bus (USB). The monitor 1260 or other type of display device may also be connected to the system bus 1201. The monitor 1260 may also be integrated with a touch-screen panel or the like.

The computing device 1200 may be implemented in a networked or cloud-computing environment using logical connections of a network interface 1203 to one or more remote devices, such as a remote computer. The remote computer may be a personal computer, a server, a router, a network PC, a peer device or other common network node, and typically includes many or all of the elements described above relative to the computing device 1200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 1200 may be connected to a public and/or private network through the network interface 1203. In such embodiments, a modem or other means for establishing communications over the network is connected to the system bus 1201 via the network interface 1203 or other appropriate mechanism. A wireless networking component including an interface and antenna may be coupled through a suitable device such as an access point or peer computer to a network. In a networked environment, program modules depicted relative to the computing device 1200, or portions thereof, may be stored in the remote memory storage device.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 1202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Computing systems or devices referenced herein may include desktop computers, laptops, tablets e-readers, personal digital assistants, smartphones, gaming devices, servers, and the like. The computing devices may access computer-readable media that include computer-readable storage media and data transmission media. In some embodiments, the computer-readable storage media are tangible storage devices that do not include a transitory propagating signal. Examples include memory such as primary memory, cache memory, and secondary memory (e.g., DVD) and other storage devices. The computer-readable storage media may have instructions recorded on them or may be encoded with computer-executable instructions or logic that implements aspects of the functionality described herein. The data transmission media may be used for transmitting data via transitory, propagating signals or carrier waves (e.g., electromagnetism) via a wired or wireless connection.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for regularizing Vision Transformers, comprising:

a processor in communication with a memory, the memory including instructions executable by the processor to:

access a plurality of input images;

access a parameter for a patch size;

generate a plurality of patched images from the plurality of input images by:

selecting a first image in the plurality of images and selecting a second image in the plurality of images, dividing the first image and the second image into a plurality of patches of equal size based on the parameter for patch size, determining a mixing ratio for selecting a proportion of patches from the first image and proportion of patches from the second image;

generate a patched image based on the first image, the second image, and the mixing ratio, wherein the patched image is comprised of patches from the first image and the second image and the relative position of the patches from the first image and the patches from the second image remains consistent; and train a model based on the plurality of patched images.

2. The system of claim 1, further comprising using a supervised approach.

3. The system of claim 1, further comprising using a semi-supervised approach.

\* \* \* \* \*